Patented Nov. 11, 1947

2,430,589

UNITED STATES PATENT OFFICE 2,430,589

LIGHT-STABLE CALCIUM CHROMATE PIGMENT

Clifford Kanne Sloan, Thornton, Pa., assignor to E. I. du Pont de Nemours & Company, Wilmington, Del., a corporation of Delaware No Drawing. Application April 28, 1943, Serial No. 484,882

4 Claims. (Cl. 106—302)

This invention relates to the production of novel pigment-useful substances, and more particularly to the preparation of improved metal protective pigments of the alkaline earth chromate type.

Metal protective pigments have long been used in the priming coat of organic film-forming compositions applied to the surface of metal or like objects. Such pigments have been effective, at least in part, because of a specific inhibiting or passivating action at the surface of the metal.

Among the pigments that have been suggested for use in this field are certain types of calcium chromate which are usually prepared by reacting a solution of an alkali chromate or bichromate (sodium, potassium, etc.) with a solution of a soluble salt of calcium (chloride, nitrate, etc.). As far as is known, such materials have not found appreciable commercial use. Among the deficiencies that may be responsible for such low use is the marked, undesired color change on exposure to light and the atmospheric elements which films pigmented with calcium chromate undergo. Such films tend to become greenish and occasionally brownish when exposed to sunlight. Even more objectionable is the spotty, brownish pattern that often develops, presenting to the ordinary observer an appearance suggestive of spot rusting. As a consequence, the user of metal protective pigments is apt to be unduly prejudiced by his first examination, thus seriously decreasing the chance that the calcium chromate pigment will be given a fair trial as to true merit.

The present invention has as an object the production of novel alkaline earth chromate-containing pigments, and more specifically, the preparation of new, relatively stable, light-resistant calcium chromate-containing pigments. A further object is to decrease the color change which occurs on exposure of a coating composition film containing said pigments. Other objects and advantages of the invention will be apparent from the following description thereof.

These and other objects are accomplished in this invention, which comprises blending or otherwise intimately associating with an alkaline earth chromate at least one of the colored, water-insoluble metal oxides having the general formula $M_2O_3$.

In a more specific and preferred embodiment, the invention comprises rendering a calcium chromate pigment substantially stable and resistant towards light and atmospheric influences by intimately associating therewith minor amounts of a colored, water-insoluble, trivalent oxide of metals having atomic weights ranging between 51 and 57, e. g., $Cr_2O_3$, $Mn_2O_3$ and $Fe_2O_3$.

In one practical and preferred adaptation of the invention, a relatively small amount, say, from about 10%–15% of a preferred form of modifying agent, such as pigment grade iron oxide, is homogeneously mixed with a calcium chromate pigment, said percentage amounts being on the basis of said calcium chromate. Such incorporation or intimate association of the modifying agent with the pigment can be conveniently effected by adding the desired proportions of pigment and agent to a conventional type of mixer, amalgamator, or milling device, or, if preferred, said agent may be added either to (1) the strike liquors, (2) the alkaline earth slurry after striking, or (3) the ingredients may be dry blended; or (4) the agent may be blended with the pigment during preparation of a paint or coating composition which is to contain said pigment. After desired homogeneous association of the pigment and modifying agent has been effected, the resulting product will be generally useful as a pigment and as the sole pigmenting substance of a film-forming composition. It will be found particularly useful as the primer pigment in films of organic coating compositions for the protection of metallic surfaces, particularly those materials that are subject to corrosion. Thus, it will be especially useful in the protection of iron and steel surfaces and the protection of non-ferrous metals, including aluminum, zinc, magnesium, and the like, of alloys, especially light weight alloys, such as those of aluminum and magnesium. Due to presence of the modifying or treating agent, said pigment, when present in such organic coating composition vehicles, will exhibit exceedingly high color stability, even after prolonged exposure to atmospheric influences.

To a more complete understanding of the invention, the following specific examples are given, which are to be considered as merely in illustration but not in limitation of the invention:

Example I

Two calcium chromate-containing paints are made up in a linseed oil vehicle so that 40% by volume of the film solids is pigment. In paint A, calcium chromate is used as the sole pigment; whereas in paint B, 16⅔% of the calcium chromate is replaced by an equal volume of red iron oxide during the paint formulation. After application to a structural steel I-beam surface and exposure to the atmospheric elements, the film containing the modified calcium chromate pigment combination (B) shows uniform unchanged color; whereas the unmodified calcium chromate (A) shows irregular color gradation (being relatively greenish on certain areas and yellowish on others) and shows irregular brownish blotches on certain areas particularly those portions of the beam subject to prolonged water condensation.

*Example II*

A calcium chromate-containing pigment of improved color stability is produced by addition of pigment grade iron oxide to the liquors used in striking normal calcium chromate from calcium chloride and sodium chromate, using 6 parts by weight of iron oxide to 100 parts by weight of calcium chromate. The mixture of calcium chromate and iron oxide is then filtered, washed, and dried by standard procedures. Incorporated in organic vehicles, it shows high color stability on exposure.

*Example III*

Equal parts by weight of calcium chromate and iron oxide pigments are dry blended by first tumbling together and then passing through a "Mikropulverizer" equipped with a coarse screen. The resultant pigment is color stable when exposed in organic film-forming vehicles applied as a protective coating on metal surfaces. Furthermore, the protective film appears to be at least as effective in prevention of corrosion as is one containing calcium chromate as the sole pigment.

While the invention has been described in reference to its preferred adaptation involving the treatment of calcium chromate pigments with the preferred colored, water-insoluble oxides of the trivalent metals of chromium, manganese and iron, it is not limited thereto, nor to the indicated amounts of modifying agents or methods of incorporating said agents in the pigment. Thus, other alkaline earth chromates besides that of calcium, such as those of strontium and barium, may be treated in accordance with the invention, the addition thereto or incorporation therein of minor amounts of water-insoluble, colored oxides of the general formula $M_2O_3$ likewise effecting desired improvement in their light-fastness, pigmenting and inhibitive characteristics. These chromate pigments are, as already noted, usually obtained by reacting an alkali metal chromate or bi-chromate with a soluble salt (chloride, nitrate, etc.) of the metal in question. Also contemplated for treatment herein are the calcium or other alkaline earth metal chromate pigments which have been modified by treatment with ammonium phosphate, alkali phosphates or alkaline earth phosphates. The modification of alkaline earth chromate pigments with phosphates can be accomplished in accordance with the procedure described for chrome ore pigments in my co-pending application Serial No. 484,879, filed April 28, 1943.

As noted above, the amount of the $M_2O_3$ type of pigment which is to be associated with the alkaline earth chromate is not highly critical. Whereas most of the desired effect can be obtained by adding as little as about 3% (on the basis of the alkaline earth chromate), an amount of from about 10%–15% is to be preferred. While such relatively small amounts suffice for most practical purposes, larger amounts (up to, say, 50% may be used). In the latter instances, however, care must be exercised that the metal protective property of the pigment is not substantially affected or reduced by resort to excessive substitution.

Again, while the invention has been described in connection with the use of iron oxide as the modifying agent, it will be understood that broadly use is contemplated of at least one of a group of metal oxides having the general formula $M_2O_3$ that are colored and water-insoluble in character. Thus, oxides of iron, chromium, manganese, molybdenum, nickel, bismuth, cerium, columbium, indium, iridium, lead, neodymium, osmium, rhodium, ruthenium, thallium, and titanium, either alone or in combination with one another, may be used. Preferably, however, and from a practical standpoint, the trivalent oxides of metals having an atomic weight of from 51 to 57 are employed. Included among these are ferric oxide, chromic oxide, and manganic oxide.

It is also to be understood that in the practice of the invention it is not necessary that the particular oxide used as the modifying agent be in relatively pure state. The effect of the modifier is ordinarily not decreased by the presence of other materials or minor quantities of impurities. Thus, iron oxides containing siliceous matter may be utilized, if the latter does not substantially reduce the concentration of the active pigment ingredients. In many cases it is even desirable that other pigments may be added to the $M_2O_3$/alkaline earth chromate mixture. Thus, 75/10/15 or 60/20/20 ratios of alkaline earth chromate/iron oxide/talc mixtures will be found particularly useful from the standpoints of color stability, application properties and metal protection. If desired, other inert extenders, such as asbestine and the like, may be used instead of talc in such combinations.

The alkaline earth chromate pigments treated in accordance with the present invention will, as stated, possess general utility as pigment substances, and are especially useful in those cases where there is a prolonged period between an application of the priming coat and the top coat. It is during this interval before application of the top coat that use of one of the prior art pigments, namely, red lead, often leads to the unseemly appearance of structures, due to chalking and erosion of the pigment. By the practice of this invention, it is possible to utilize the inhibitive action of the pigment of the calcium chromate type without producing temporarily unsightly structures.

It is also to be understood that the product of this invention is generally useful as an inhibitive pigment inorganic film-forming vehicles and is of particular utility when such systems are used in the protection of metal surfaces. Thus, the treated pigment is useful in various oleoresinous vehicles, including linseed oil, China-wood oil, oiticica oil and the like, nitrocellulose and other cellulose derivatives used in coating compositions, chlorinated rubber, alkyd and alkyd-fortified oleoresinous systems, phenolformaldehyde resins, such as Bakelite and the like, Vinylite, vinyl acetate and polyhydric alcohol-mixed esters of drying oil acids and other monofunctional, monocarboxylic acids, such as beta-furyl-acrylic acid, delta-2,4-hexadienoic acid, methacrylic acid, alpha-vinyl-cinnamic acid, and the like, and in synthetic resin vehicles generally.

I claim:

1. As a new, light-stable pigment product, calcium chromate containing as an essential ingredient thereof from about 3% to 15%, based on said chromate, of a colored, water-insoluble, trivalent oxide of a metal having an atomic weight ranging between 51 and 57.

2. As a new, light-stable pigment product, calcium chromate intimately associated with from about 10%–15%, on the basis of said chromate, of chromic oxide.

3. As a new, light-stable pigment product calcium chromate intimately associated with from about 10%–15%, on the basis of said chromate, of ferric oxide.

4. As a new, light-stable pigment product calcium chromate intimately associated with from about 10%–15%, on the basis of said chromate, of manganic oxide.

CLIFFORD KANNE SLOAN.

REFERENCES CITED

The following references are of record in the file of this patent:

FOREIGN PATENTS

| Number | Country | Date |
|--------|---------|------|
| 406,445 | Great Britain | Mar. 1, 1934 |

OTHER REFERENCES

Mattiello, "Protective and Decorative Coatings," vol. 2, 1942, pages 273, 281, 323, and 324.